US009154596B2

(12) United States Patent
Khanduri

(10) Patent No.: US 9,154,596 B2
(45) Date of Patent: Oct. 6, 2015

(54) METHOD AND SYSTEM FOR AUDIO SYSTEM VOLUME CONTROL

(75) Inventor: Prakash Khanduri, Freehold, NJ (US)

(73) Assignee: Broadcom Corporation, Irvine, CA (US)

( * ) Notice: Subject to any disclaimer, the term of this patent is extended or adjusted under 35 U.S.C. 154(b) by 1455 days.

(21) Appl. No.: 12/548,758

(22) Filed: Aug. 27, 2009

(65) Prior Publication Data

US 2011/0021241 A1 Jan. 27, 2011

Related U.S. Application Data

(60) Provisional application No. 61/228,415, filed on Jul. 24, 2009.

(51) Int. Cl.
*H04M 1/00* (2006.01)
*H04M 1/60* (2006.01)

(52) U.S. Cl.
CPC .................................. *H04M 1/6016* (2013.01)

(58) Field of Classification Search
USPC .......... 379/390.01–390.03, 395, 404, 388.03, 379/388.05, 388.06; 455/232.1, 234.1, 455/234.2, 235.1, 245.1, 246.1, 247.1, 455/250.1; 381/104, 106, 107, 119; 700/94
See application file for complete search history.

(56) References Cited

U.S. PATENT DOCUMENTS 5,640,195 A * 6/1997 Chida ........................ 348/14.01
6,084,959 A * 7/2000 Yun .......................... 379/373.02
7,463,170 B2 12/2008 Kong et al.
7,515,071 B2 4/2009 Kong et al.
7,912,728 B2 3/2011 Kong et al.
8,082,050 B2 12/2011 Schmidt et al.
2002/0181724 A1 12/2002 Jiang et al.

(Continued)

FOREIGN PATENT DOCUMENTS

KR 1020080049684 6/2008
WO WO 2008/005046 1/2008

OTHER PUBLICATIONS

Non-final Office Action for U.S. Appl. No. 12/248,246 issued on Mar. 7, 2012.

(Continued)

*Primary Examiner* — Yuwen Pan
*Assistant Examiner* — Fatuma Sherif
(74) *Attorney, Agent, or Firm* — Sterne, Kessler, Goldstein & Fox PLLC

(57) ABSTRACT

A communication device may determine total gain for a downlink processing path via the communication device. The total gain may be determined based on determination of audio requirements for each of a plurality of audio processing devices supported via the communication device, during the downlink processing path. The communication device is operable to determine a default mix signal gain, a downlink gain adjustment and a calibration gain based on the determined audio requirements, and to calculate the total gain for the downlink processing path based on the determined default mix signal gain, the downlink gain adjustment and the calibration gain. The determination of the total gain may be based on determination of a telephony state in the communication device. The calibration gain may be determined during calibration of the communication device, whereas the downlink gain adjustment may be calculated based on an adjustment step-size and/or a mode based gain index.

21 Claims, 4 Drawing Sheets

(56) References Cited

U.S. PATENT DOCUMENTS

2003/0171882 A1 9/2003 Thielman et al.
2004/0073422 A1* 4/2004 Simpson et al. .............. 704/225
2004/0122541 A1 6/2004 DiSanza et al.
2005/0136848 A1 6/2005 Murray
2007/0269057 A1* 11/2007 Ding et al. .................... 381/107
2008/0002668 A1 1/2008 Asokan et al.
2008/0125141 A1* 5/2008 Lai ............................ 455/456.1
2008/0130913 A1 6/2008 Kong
2008/0130916 A1 6/2008 Kong
2008/0133224 A1 6/2008 Kong
2009/0252350 A1* 10/2009 Seguin .......................... 381/109
2010/0057471 A1* 3/2010 Kong et al. ................... 704/500
2010/0232626 A1* 9/2010 Paquier et al. ................ 381/119

OTHER PUBLICATIONS

European Search Report for European Patent Application No. 09010671.7-2414 issued Dec. 2, 2009.

* cited by examiner

METHOD AND SYSTEM FOR AUDIO SYSTEM VOLUME CONTROL

CROSS-REFERENCE TO RELATED APPLICATIONS/INCORPORATION BY REFERENCE

This patent application makes reference to, claims priority to and claims benefit from U.S. Provisional Application Ser. No. 61/228,415 filed on Jul. 24, 2009.

FEDERALLY SPONSORED RESEARCH OR DEVELOPMENT

[Not Applicable].

MICROFICHE/COPYRIGHT REFERENCE

[Not Applicable].

FIELD OF THE INVENTION

Certain embodiments of the invention relate to audio processing. More specifically, certain embodiments of the invention relate to a method and system for Audio System Volume Control.

BACKGROUND OF THE INVENTION

The field of communication has seen dramatic growth the last few years, especially wireless communication. In today's world, most people use their wireless devices for various purposes, business and personal, on a constant and daily basis. Society is truly becoming a wireless one. A lot of wireless solutions have been introduced, and have made tremendous strides into everyday's life.

For example, the use of Wireless Personal Area Networks (WPAN) has gained a lot of popularity in a great number of applications because of the flexibility and convenience in connectivity they provide. WPAN systems generally replace cumbersome cabling and/or wiring used to connect peripheral devices and/or mobile terminals by providing short distance wireless links that allow connectivity within very narrow spatial limits (typically, a 10-meter range). WPAN may be based on standardized technologies, for example Class 2 Bluetooth (BT) technology. While WPAN may be very beneficial for certain applications, other applications may require larger service areas and/or capabilities.

Other technologies have been developed to provide greater wireless service. Wireless Local Area Networks (WLAN) systems may operate within a 100-meter range, for example. In contrast to the WPAN systems, WLAN provide connectivity to devices that are located within a slightly larger geographical area, such as the area covered by a building or a campus, for example. WLAN systems are generally based on specific standards, for example IEEE 802.11 standard specifications, and typically operate within a 100-meter range, and are generally utilized to supplement the communication capacity provided by traditional wired Local Area Networks (LANs) installed in the same geographic area as the WLAN system.

Other forms of wireless solutions have evolved from traditional land-based communication technologies. For instance, cellular phones have become an almost absolute necessity in today's world. Many modern cellular technologies, including such technologies as GSM/GPRS/EDGE, UMTS, and CDMA2000, incorporate many features and capabilities. Most of today's cellular services include, in addition to voice calls, such features as text messaging, video streaming, and/or web browsing.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for Audio System Volume Control, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for Audio System Volume Control. A communication device may be operable to determine total gain for a downlink processing path via the communication device. The determination of the total gain may be performed based on determination of audio requirements for each of a plurality of audio processing devices supported via the communication device, during the downlink processing path via the communication device. The device may be operable to determine a default mix signal gain, a downlink gain adjustment and a calibration gain based on the determined audio requirements, and to calculate the total gain for the downlink processing path based on the determined default mix signal gain, the downlink gain adjustment and the calibration gain. The plurality of audio processing devices may enable handling communication of audio signals corresponding to downlink voice call audio streams, ring tones, music, and/or dual-tone multi-frequency (DTMF) based audio playback. The determination of the total gain may be based on determination of a telephony state in the communication device, where the telephony state may comprise an off-hook and an on-hook state. The calibration gain may be determined during calibration of the communication device, whereas the downlink gain adjustment may be calculated based on an adjustment step-size and/or a mode based gain index, by multiplying, for example, the adjustment step-size and/or the mode based gain index. The adjustment step-size may be determined based on user input and/or preferences. The mode based gain index may be selected, based on audio mode, from a plurality of predetermined signal gain indexes, wherein each of the audio modes corresponds to an audio play combination comprising audio signals from one or more the plurality of audio processing devices supported via the communication device in the communication device. The plurality of predetermined signal gain indexes may be calculated during manufacture and/or calibration of the communication device, and/or based on user input and/or preferences whenever adjusted. The plurality of predetermined signal gain indexes may be stored in one or more look-up tables in a memory of the communication device, where it may be retrieved based on applicable audio mode.

Figure 1:
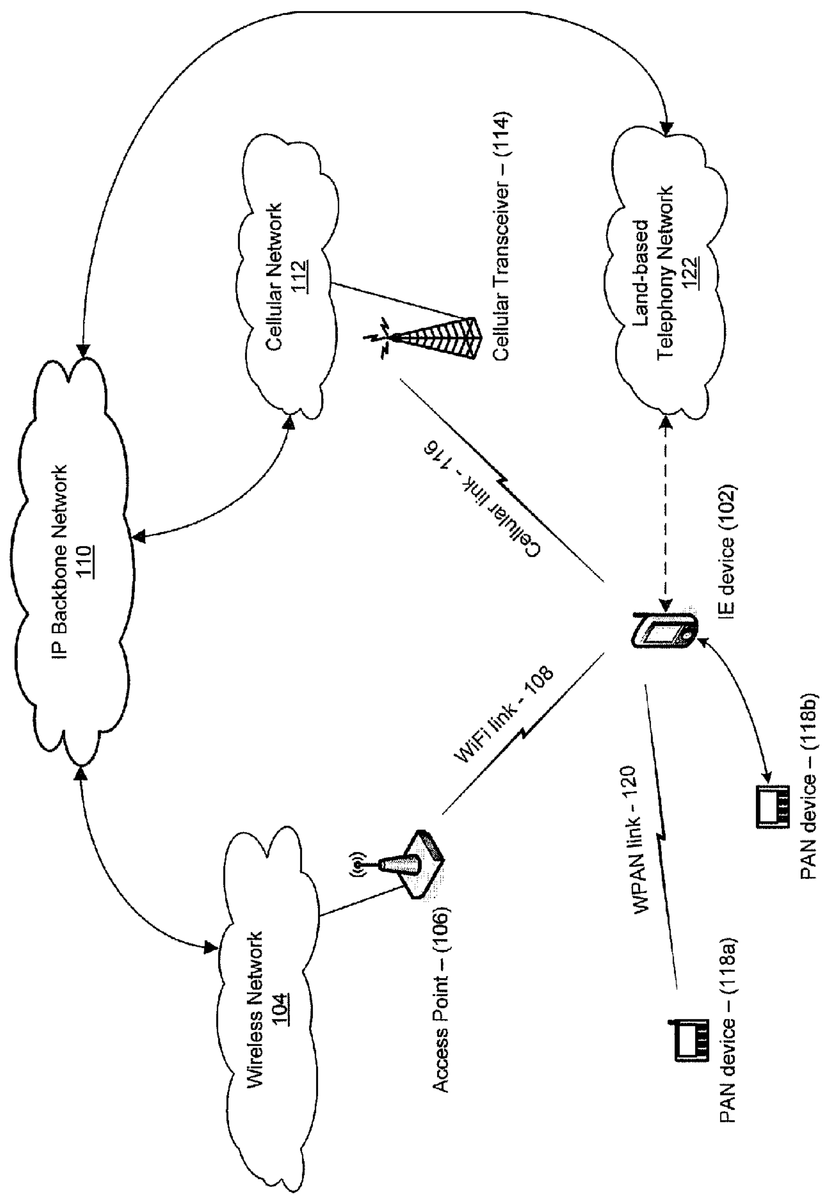
FIG. 1 is a block diagram that illustrates an exemplary system comprising an intelligent endpoint device, which may be operable to provide audio system volume control, in accordance with an embodiment of the invention.

FIG. 1 is a block diagram that illustrates an exemplary system comprising an intelligent endpoint device, which may be operable to provide audio system volume control, in accordance with an embodiment of the invention. Referring to FIG. 1, there is shown an intelligent endpoint (IE) device 102, a wireless network 104, an access point 106, a distribution network 108, a WiFi link 108, an IP backbone network 110, a cellular network 112, a cellular transceiver 114, a cellular link 116, a Personal Area Networks (PAN) device 118*a*, a Personal Area Networks (PAN) device 118*b*, a Wireless Personal Area Networks (WPAN) link 120, and a land-based telephony network 122.

The intelligent endpoint (IE) device 102 may comprise suitable logic, circuitry, code, and/or interfaces that may be operable to communicate with a plurality of wireless and/or wired networks. The IE device 102 may also be operable to perform additional non-communicative tasks. For example, the IE device 102 may be utilized to enable personal communication, comprising, for example, peer-to-peer voice or data calls. The IE device 102 may also be operable to provide audio/video recording or playing, and/or various other tasks, which may be requested, for example, via the IE device 102 by a device user. The IE device 102 may be operable to communicate with one or more of supported wireless and/or wired networks, and may also be operable to use local and/or remote devices, to perform tasks requested via the IE device 102, for example. A user of the IE device 102 may utilize the IE device 102 directly, via supported user interfaces within the IE device 102, and/or indirectly via available networks and/or via other devices, such as the PAN device 118, which may interact with the IE device 102 via a communication interface. For example, the IE device 102 may comprise a portable handheld communication device, such as a Smartphone, a cell phone, a PDA, a multimedia device, which may be communicatively coupled to plurality of available networks, resources, and/or other communication devices which may exist locally and/or remotely. For example, the IE device 102 may be communicatively coupled to storage resources from which audio/video content may be retrieved during media playback operations via the IE device 102. The IE device 102 may also be communicatively coupled to dedicated processing resources that enable offloading at least some processing operation from the IE device 102, to save power, memory, and/or processing capability, and/or to improve performance.

The wireless network 104 may comprise suitable logic, circuitry, code, and/or interfaces that may enable implementing functional blocks corresponding to one or more wireless technologies. Exemplary wireless technologies may comprise WLAN (IEEE 802.11) and/or WiMAX (IEEE 802.16) architectures. Access to the wireless network 104 may be provided via a plurality of the access point 106. The access point 106 may comprise suitable logic, circuitry, code, and/or interfaces that may enable providing wireless access, via the wireless network 104, to one or more suitably capable wireless devices, for example the IE device 102, via the WiFi link 108.

The cellular network 112 may comprise a plurality of the cellular transceivers 114, and suitable logic, circuitry, code, and/or interfaces that may be operable to communicate utilizing one or more cellular technologies. Exemplary cellular technologies may comprise CDMA, WCDMA, CDMA1000, HSDPA, GSM, GPRS, EDGE, and/or UMTS. The cellular transceiver 114 may comprise suitable logic, circuitry, code, and/or interfaces that may be operable to transmit and/or receive cellular based communications between the cellular network 112 and cellular capable devices, for example the IE device 102, via the cellular link 116. For example, the cellular transceiver 114 may correspond to cellular towers and/or base stations within a cellular communication system.

The IP backbone network 110 may comprise suitable logic, circuitry, code, and/or interfaces that may be operable to provide overall system connectivity among local and/or remote sub-networks, to facilitate IP related data communication. The IP backbone network 110 may be enabled to interact with, and connect different wired and/or wireless technologies. For example, the IP backbone network 110 may enable data connectivity between different interface nodes linking wired and/or wireless networks comprising WLAN networks, WiMAX networks, cellular networks, LAN networks, and/or land-based telephony networks.

Each of the PAN devices 118*a* and 118*b* may comprise suitable logic, circuitry, code, and/or interfaces that may be operable to perform some accessory functionality in conjunction with the use of the IE device 102 based on a PAN protocol. For example, the PAN device 118*a* may comprise a hands-free headset that may be utilized, in conjunction with the IE device 102 to facilitate cellular calls and/or cellular data communication sessions. The PAN device 118*b* may comprise, for example, a headphone that may be utilized to listen to audio streams played via the IE device 102. The IE device 102 may interact with the PAN devices 118*a* and/or 118*b* via one or more PAN interfaces, which may be based on wired and/or wireless PAN protocols. For example, the IE device 102 may communicate with the PAN device 118*b* via wired connection, and may communicate with the PAN device 118*a* via the WPAN link 120. The WPAN link 120 may be based on a standardized technology for inter-device short range communication. For example, the WPAN link 120 may correspond to Bluetooth, ZigBee, and/or Ultra-Wideband (UWB) connections between the PAN device 118 and the IE device 102.

The land-based telephony network 122 may comprise suitable logic, circuitry, code, and/or interfaces that may be operable to provide wire-line based connectivity between local and/or remote entities. For example, the land-based telephony network 122 may comprise a standard telephony network (POTS), a hybrid telephone network or an IP based telephone network, which may enable telephony based connectivity between different nodes.

In operation, the IE device 102 may be operable to provide personal communications, via wireless and/or wired connections. The IE device 102 may be operable to provide network connectively, wirelessly, through the wireless network 104 and/or the cellular network 112. In this regard, the IE device 102 may enable transmission and/or reception of data to and/or from access point 106 and/or the cellular transceiver 114, via the WiFi link 108 and/or the cellular link 116, respectively. The access point 102 may be operable to, for example, support wireless links, such as WLAN and/or WiMax links. The cellular device 116 may be operable to access the cellular network 112 at, for example, the cellular transceiver 114, via cellular links. The IE device 102 may also provide wired connectivity via the land-based telephony network 122. Accordingly, the IE device 102 may be operable convergence of a plurality of telephony technologies during personal communication via the IE device 102. Using such supported telephony technologies, the IE device 102 may enable communication of audio and/or multimedia communications. The IE device 102 may be used, for example, to support voice calls or to transfer multimedia information between one or more users of the IE device 102. Some of the data communicated via the IE device 102 may be communicated to and/or from device users through the PAN devices 118*a* and/or 118*b*, via one or more PAN interfaces, which may comprise wireless and/or wired interfaces.

In an exemplary aspect of the invention, the IE device 102 may comprise an audio sub-system (not shown), which may be operable to manage, control, and/or perform audio processing operations in IE device 102, to support, for example, telephony convergence, where connectivity may be provided via a plurality of telephony solutions, comprising, for example, cellular, landline, and/or IP based protocols. The audio sub-system may be implemented using one or more dedicated components, and/or at least some of the functions and/or operations of the audio sub-system may be performed via existing components in the IE device 102. The audio sub-system may be operable to enable concurrent play of a plurality of audio streams, including, for example, downlink audio playback during voice calls, music playback from local and/or remote sources, ring tones, and/or dual-tone multi-frequency (DTMF) tones. In various embodiments of the invention, a volume control mechanism may be utilized by the IE device 102 to enable controlling, managing, and/or adjusting of overall audio signal gain in the IE device 102 when a plurality of audio sources require playback operations within the IE device 102.

Figure 2A:
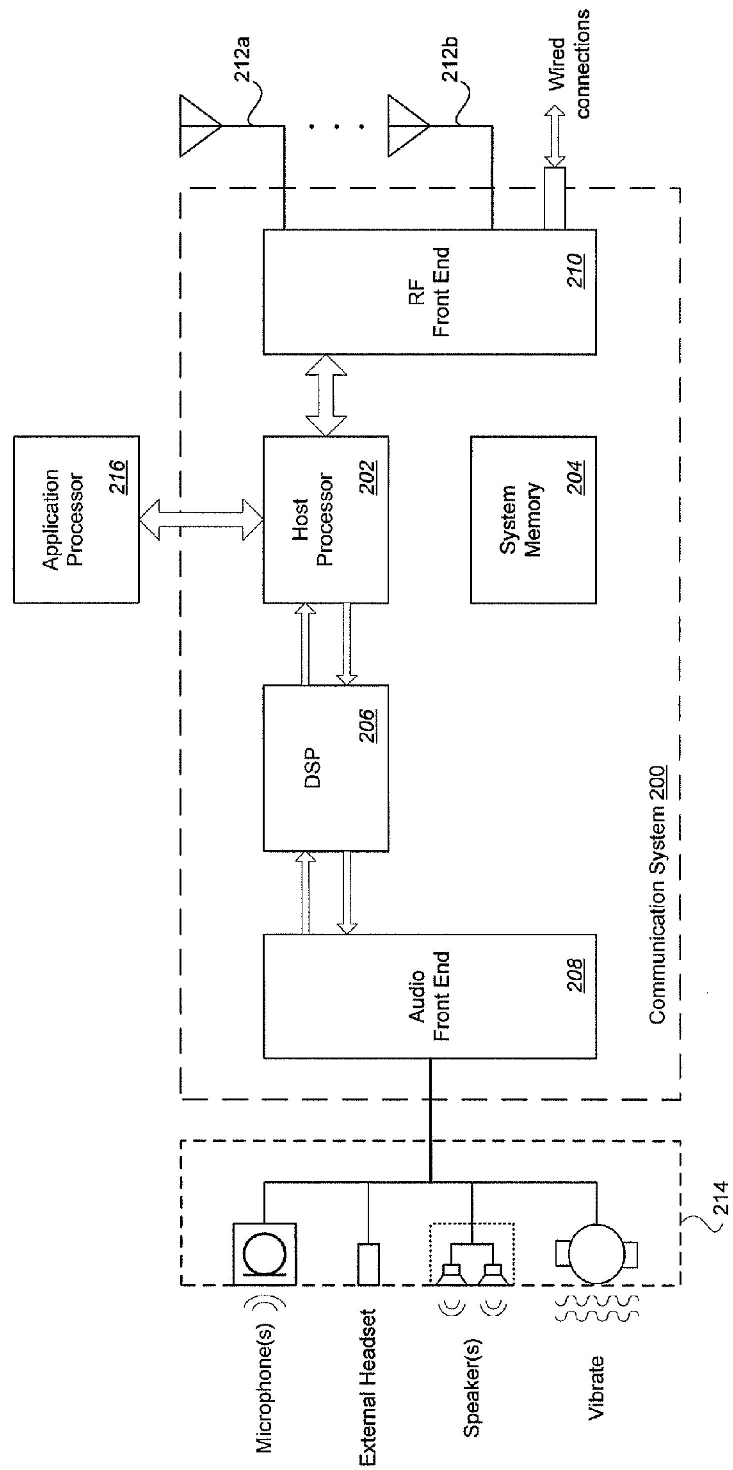
FIG. 2A is a block diagram that illustrates an exemplary communication system that enables audio processing and management in an intelligent endpoint device, in accordance with an embodiment of the invention.

FIG. 2A is a block diagram that illustrates an exemplary communication system that enables audio processing and management in an intelligent endpoint device, in accordance with an embodiment of the invention. Referring to FIG. 2A, there is shown a communication system 200, a host processor 202, a system memory 204, a digital signal processor (DSP) 206, an audio front-end 208, an RF front-end 210, a plurality of antennas 212*a*, . . . , 212*b*, an audio input/out (I/O) system 214, and an applicant processor 216.

The communication system 200 may comprise the host processor 202, the system memory 204, the DSP 206, the audio front-end 208, the RF front-end 210, and may also comprise suitable logic, circuitry, code, and/or interfaces that may be operable to provide various communication and/or processing operations. The communication system 200 may be integrated, for example, in the IE device 102 to enable performing various communication and/or applications in the IE device 102, including, for example, network connectivity to one or more wireless and/or wired networks, voice calls, and/or audio generation, capture, and/or playback operations.

The host processor 202 may comprise suitable logic, circuitry, code, and/or interfaces that may enable performing control and/or processing operations in the communication system 200. The invention may not be limited to a specific processor, but may comprise for example, a general purpose processor, a specialized processor or any combination of suitable hardware, firmware, software and/or code, which may be enabled to support and/or control operations of the communication system 200. The system memory 204 may comprise suitable logic, circuitry, code, and/or interfaces that may enable permanent and/or non-permanent storage and fetch of data and/or code used by the host processor 202, for example, during management related processing operations. In this regard, the system memory 204 may comprise different memory technologies, including, for example, read-only memory (ROM), random access memory (RAM), and/or Flash memory.

The DSP 206 may comprise suitable logic, circuitry, code, and/or interfaces that may enable processing audio signals. The DSP 206 may encode, decode, modulate, demodulate, encrypt, and/or decrypt audio signals. In various embodiments of the invention, the DSP 206 may be operable to perform computationally intensive processing of audio signals, which may comprise signal gain calculations, for example.

The RF front-end subsystem 210 may comprise suitable logic, circuitry, code, and/or interfaces that may be operable to perform RF transmission and/or reception during wireless communications, utilizing a plurality of antennas and/or frequency bands, and/or during wired communication, via plurality of wired connections. The RF front-end subsystem 210 may be operable to enable, for example, performing wireless communications via the plurality of antennas 212*a*, . . . , 212*b*. Each of the plurality of antennas 212*a*, . . . , 212*b* may comprise suitable logic, circuitry, code, and/or interfaces that may enable transmission and/or reception of RF signals within certain bandwidths and/or based on certain protocols. One or more of the plurality of antennas 212*a*, . . . , 212*b* may be operable to provide various smart and/or adaptive antenna techniques that may enable, for example, beamforming, receive diversity and/or transmit diversity. For example, one or more of the plurality of antennas 212*a*, . . . , 212*b* may enable RF transmission and/or reception via the 2.4 GHz, which is suitable for WiMAX, Bluetooth and/or WiFi RF transmissions and/or receptions. The RF front-end 210 and/or the plurality of antennas 212*a*, . . . , 212*b* may be utilized to enable transmission and/or reception of audio data. The communication of audio data may be directed at remote entities, via one or more support network connections, and/or one or more local entities such as the PAN device 118*a*.

The audio front-end 208 may comprise suitable logic, circuitry, code, and/or interfaces that may be operable to utilize a plurality of audio input/output (I/O) components by the communication system 200, to enable generation, capture, and/or playback of audio data. The audio front-end 208 may be operable, for example, to enable use of the audio I/O subsystem 214 via the communication system 200. The audio I/O subsystem 214 may comprise suitable logic, circuitry, code, and/or interfaces that may enable capture, generation, and/or playback of audio data during communication and/or application processing in the communication system 200. The audio I/O subsystem 214 may comprise, for example, microphones, speakers, external headsets outlets, and/or vibration transducers.

The application processor 216 may comprise suitable logic, circuitry, code, and/or interfaces that may be operable to manage, and/or support various applications via the communication system 200. The application processor 216 may be operable, for example, to enable playback of previously recorded and/or received music files via the audio front-end 208 and/or the audio I/O subsystem 214.

In operation, the communication system 200 may be operable to perform communication and/or processing tasks in the IE device, for example. The communication system 200 may be operable to establish one or more wireless connections, via the RF front-end 210 and one or more of the plurality of antennas 212*a*, . . . , 212*b*. Exemplary connections may comprise Bluetooth, WiFi, WiMAX, and/or cellular connections. Thus, the communication system 200 may be operable to enable convergence of various telephony architectures and/or technologies in the IE device 102. The communication system 200 may also enable performing a plurality of applications, via the application processor 216 for example. Some of the applications may require generation and/or playback of audio data. For example, the application processor 216 may be utilized to retrieve and/or playback music. Accordingly, the communication system 200 may comprise an audio subsystem which may be operable to manage, control and/or perform audio processing operations in the communication system 200, to support, for example, telephony convergence and/or performing applications supported via the communication system 200. The audio subsystem may comprise, for example, the audio front-end 208 and/or the audio I/O subsystem 214, which may be utilized to facilitate and/or perform audio capture, generation, and/or playback during voice calls and/or audio related applications in the communication system 200. Audio processing may performed via available processing resources in the communication system 200, including, for example, the host processor 202, the system memory 204, and/or the DSP 206. In some embodiments of the invention, a dedicated audio processor may also be utilized to perform, separately and/or in conjunction with other components and/or subsystems, audio processing and/or functions in the communication system 200.

In an exemplary aspect of the invention, the communication system 200 may be operable to support and/or perform concurrent voice calls and/or audio related application. For example, one or more voice calls may be terminated and/or initiated, via wired and/or wireless connection, in the communication system 200. During voice calls, downlink audio streams may be played via the communication system 200, utilizing the audio front-end 208 and/or speakers in the audio I/O subsystem 214. At the same time, other operations and/or tasks, which may be supported and/or performed via the communication system 200, may also generate audio data that need be played via the communication system 200. For example, the communication system 200 may enable playback of music, generation of ringer tones (e.g. to signal reception of other calls), and/or generation of dual-tone multi-frequency (DTMF) tones in response to user input via a keypad or touchpad and/or touch-screen interface, for example. In various embodiments of the invention, a volume control mechanism may be utilized, via the communication system 200 to enable controlling, managing, and/or adjusting overall audio signal gain in the IE device 102 when a plurality of audio sources require playback operations within the communication system 200. The volume control algorithm may be implemented, for example, via the host processor 202 and/or the DSP 206.

Figure 2B:
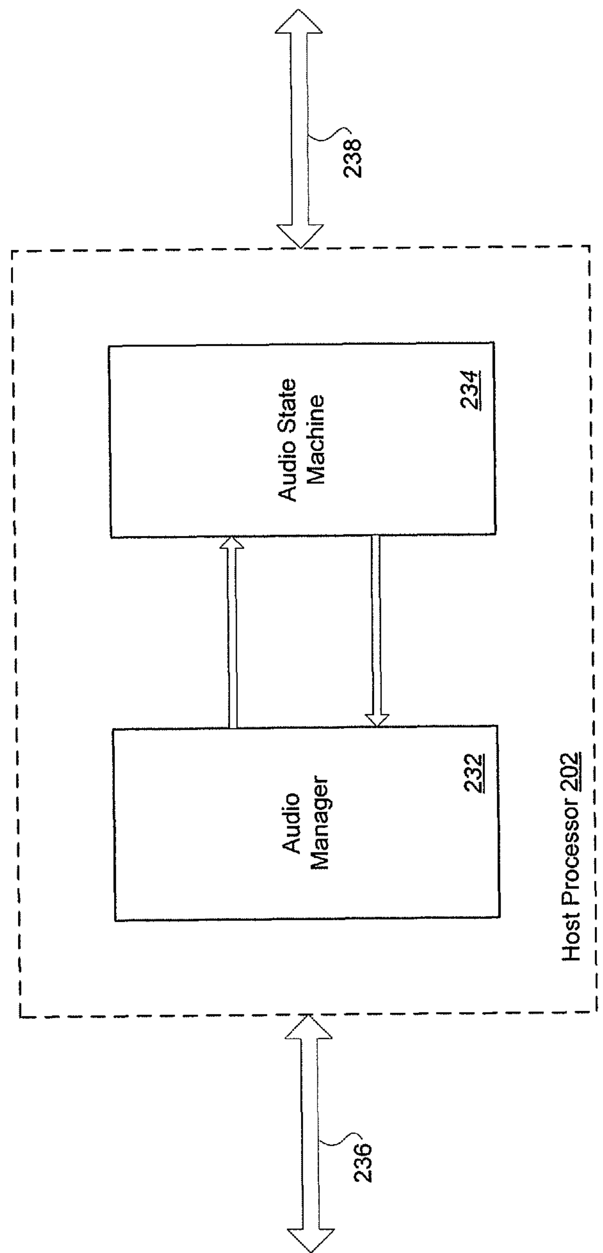
FIG. 2B is a block diagram that illustrates an exemplary host processor comprising an audio manager and an audio state machine to enable audio processing and management in an intelligent endpoint device, in accordance with an embodiment of the invention.

FIG. 2B is a block diagram that illustrates an exemplary host processor comprising an audio manager and an audio state machine to enable audio processing and management in an intelligent endpoint device, in accordance with an embodiment of the invention. Referring to FIG. 2B, there is shown the host processor 202, an audio manager 232, and an audio state machine 234. The audio manager 232 may comprise suitable logic, circuitry, code, and/or interfaces that may be operable to control and/or manage audio processing and/or functions within the communication system 200. For example, the audio manager 232 may enable controlling UL and DL media flow between the host processor 202 and the DSP 206, to facilitate, for example, audio processing in the DSP 206. The audio state machine 234 may comprise suitable logic, circuitry, code, and/or interfaces that may be operable to manage and/or control audio state related operations, comprising, for example, controlling and/or determining the telephony switch-hook state, during voice calls for example, codec selection, audio path switching, multimedia applications, and/or transducer activation. While the audio manager 232 and the audio state machine 234 are shown within the host processor 202, the invention is not so limited. In other embodiments, the audio manager 232 and/or an audio state machine 234 may be implemented, partially and/or wholly, outside the host processor 202. For example, at least some of the operations and/or functions of the audio manager 232 and/or the audio state machine 234 may be provided via the DSP 206.

In operation, the audio manager 232 and the audio state machine 234 may be operable to manage and/or control audio processing in the communication system 200. The audio state machine 234 may be utilized, for example, to maintain and/or provide information pertaining to applicable audio states and/or modes in the communication system 200. For voice calls, applicable audio states may comprise, for example, on-hook and off-hook states. The on-hook state may correspond to idle state for voice calls and/or connections; the off-hook state may correspond to active voice calls. During off-hook states, various audio modes may be utilized, where each mode may represent possible combination of voice call based DL audio data and audio signals corresponding to one or more of available audio sources in the communication system 200. The audio manager 232 may be utilized to manage and/or control audio related processing and/or functions in the communication system 200. For example, the audio manager 232 may be operable to control and/or manage audio data processing in the DSP 206; route locally generated and/or captured audio data between the DSP 206 and the RF front-end 210 and/or the audio front-end 208; and/or control downlink (DL) and/or uplink (UL) media flow via the communication system 200 during active calls. In addition, the audio manager 232 may also be operable to control, manage, and/or interface with various components that may be involved in audio processing operations in the communication system 200. For example, the audio manager 232 may be operable to enable MMI/UI interactions to receive user input and/or provide user feedback via the communication system 200. The audio manager 232 may also be utilized to manage and/or control audio related hardware and/or drivers, to enable use of the audio I/O subsystem 214, for example.

In an exemplary aspect of the invention, the audio manager 232 and/or the audio state machine 234 may be operable to provide and/or manage volume control mechanism in the communication system 200 to control, manage, and/or adjust overall audio signal gain when a plurality of audio sources require playback concurrently. In this regard, the audio state machine 234 may be operable to determine the current audio state and/or mode, while the audio manager may be operable to provide and/or specify the parameters that may be utilized to perform the volume control. During on-hook states, for example, when there is no downlink (DL) voice call audio signaling being received and/or played via the communication system 200, default and/or specified values may be utilized to control and/or adjust play volume for available audio sources in the communication system 200. For example, during on-hook states, the default signal gains, or any specified value determined via the audio manager 234 based on user input for example, may be utilized for each of the DTMF tones, ringer tones, and/or music audio signals generated and/or played via the communication system 200.

During off-hook states, when DL audio data may be received and/or played via the communication system 200, the volume control algorithm may define the total audio signal gain as a sum of the voice signal gain, and the gains of one or more additional sources, comprising, for example, ringer tones, DTMF tones, and/or music. Accordingly, the volume control algorithm for off-hook states may be defined as:

$$Gain_{total}=Gain(Voice)+Ringer\_Vol+DTMF\_Vol+Music\_Vol$$

where $Gain_{total}$ may correspond to total audio signal gain, in dB's; the Ringer_Vol may correspond to the signal gain, in dB's, caused by ringer sound, generated, for example, when subsequent calls are terminated; DTMF_Vol may correspond to, for example, tones generated when keys are pressed in keypad; the Music_Vol may correspond to, for example, signal gain, in dB's, caused by playback of music data. In an exemplary embodiment of the invention, in instances when the sum of the signal gains may cause saturation in the communication system 200, a limiting algorithm may be utilized which may comprise a total mix signal gain that may be calculated based on gain index corresponding to applicable audio play modes in the communication system 200. The volume control algorithm may then be expressed as:

$$Mix\_Gain_{total=Gaindefault}(mode)-step\_size*Gain\_index(mode)+\alpha$$

where $Mix\_Gain_{total}$ refers to the total audio signal gain, in dB's, effectuated on the combined audio signal playable in the system, and corresponding to active audio sources during a voice call; $Gain_{default}$(mode) may correspond to default signal gain, in dB's, for a specific audio mode. The Gain_index(mode) may correspond to user selectable volume step depending on the audio mode requirement. The audio mode correspond to applicable audio playback combination, which may comprise voice streaming during active voice calls and one or more of additional sources, such as the ringer, DTMF, and/or music. The step_size may correspond to user specific value that may be used to adjust the Gain_index, which may be determined based on the current audio mode. The α parameter may correspond to a gain adjustment constant, in dB's, which may be determined, for example, during system calibration. The various values for $Gain_{default}$ and/or Gain_index, for available audio modes, may be predetermined, and may be stored into look-up tables (LUTs), which may be stored, in the system memory 204 for example, for subsequent retrieval during audio processing operations.

Figure 3:
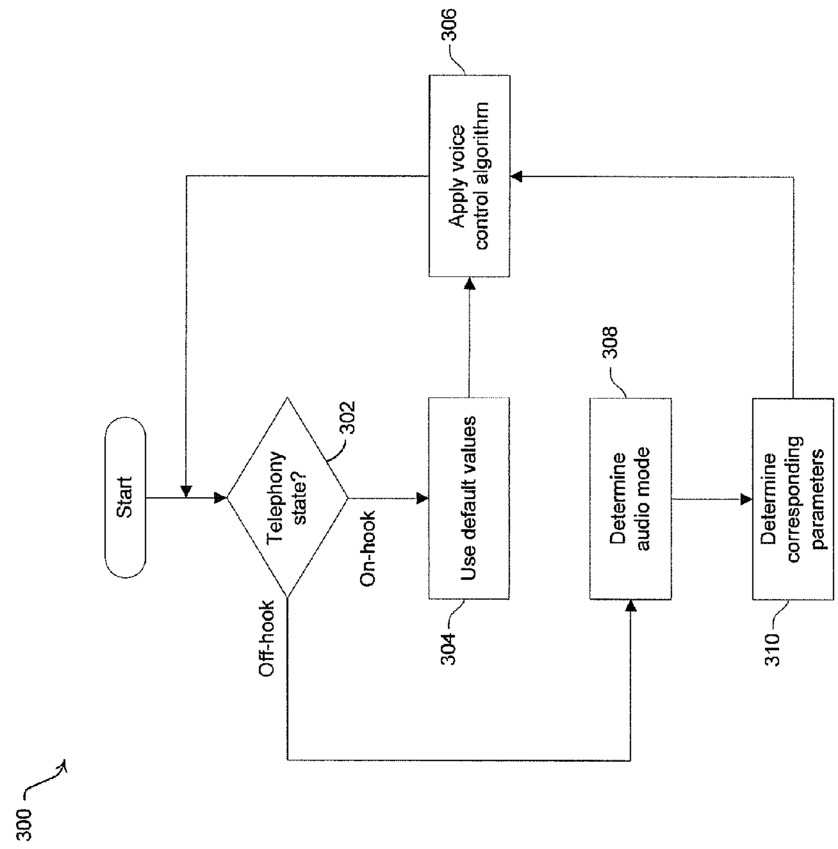
FIG. 3 is a flow chart that illustrates exemplary steps for audio system volume control during audio processing, in accordance with an embodiment of the invention.

FIG. 3 is a flow chart that illustrates exemplary steps for audio system volume control during audio processing, in accordance with an embodiment of the invention. Referring to FIG. 3, there is shown a flow chart 300 comprising a plurality of exemplary steps, which may enable management and/or control of audio signal gain during audio playback from multiple sources in a communication device.

In step 302, a determination of the telephony state may be performed. Exemplary telephony states may comprise an on-hook state, which corresponds to idle state for voice call and/or connection, and/or an off-hook state, which may correspond to active voice calls. For example, the telephony state may be determined in the communication system 200 via the audio state machine 234. In instances, where the telephony state is on-hook, the exemplary steps may proceed to step 304. In step 304, default values may be utilized for each of applicable audio sources. For example, during on-hook states in the IE device 102, the default signal gains may be utilized, based on user input for example, for each of the DTMF tones, ringer tones, and/or music signals generated and/or played via the communication system 200. In step 306, the volume control algorithm may be applied based on the determined and/or specified parameters, substantially as described with regard to, for example, FIG. 2B.

Returning to step 302, in instances where the telephony state is off-hook, the exemplary steps may proceed to step 308. In step 308, the audio mode may be determined. The audio mode may determine, for example, the applicable audio playback combination in the IE device 102. Exemplary audio playback combinations may comprise voice streaming from the voice call and one or more of additional sources, such as the ringer tones, DTMF tones, and/or music. In step 310, the corresponding parameters may be determined. For example, the total audio signal gain may be determined based on summation of the signal gain for voice call signals and one or more signal gains corresponding to other sources in the communication system 200. In instances where the sum of the signal gains may cause saturation in the communication system 200, parameters corresponding to a limiting algorithm may be utilized. The parameters for the limiting algorithm may be unique for each audio mode, and may comprise, for example, gain adjustment constants, gain indexes, and/or adjustment step-sizes, substantially as described with regard to, for example, FIG. 2B.

Various embodiments of the invention may comprise a method and system for Audio System Volume Control. Communication system 200 may be operable to determine total gain for an downlink processing path via the communication system 200. The determination of the total gain may be performed, via the audio manager 232 for example, based on determination of audio requirements for each of a plurality of audio processing devices supported via the communication system 200, during the downlink processing path via the communication system 200; determining a default mix signal gain, a downlink gain adjustment and a gain adjustment constant based on the determined audio requirements; and calculating the total gain for the downlink processing path based on the determined default mix signal gain, the downlink gain adjustment and the gain adjustment constant. The plurality of audio processing devices may enable handling, via the system processor 202, the system memory 204, the DSP processor 206, and/or the audio front-end 208, communication of audio signals corresponding to downlink voice call audio streams, ring tones, music, and/or dual-tone multi-frequency (DTMF) based audio playback, via the audio I/O subsystem 214. The determination of the total gain may be based on determination of a telephony state in the communication system 200, via the audio state-machine 234 for example, where the telephony state may comprise an off-hook and an on-hook state. The gain adjustment constant may be determined during calibration of the communication system 200, whereas the downlink gain adjustment may be calculated based on an adjustment step-size and/or a mode based gain index, by multiplying, for example, the adjustment step-size and/or the mode based gain index. The adjustment step-size may be determined based on user input and/or preferences. The mode based gain index may be selected, based on audio mode, from a plurality of predetermined signal gain indexes, wherein each of the audio modes corresponds to an audio play combination comprising audio signals from one or more the plurality of audio processing devices supported via the communication system 200 in the communication system 200. The plurality of predetermined signal gain indexes may be calculated during manufacture and/or calibration of the communication system 200, and/or based on user input and/or preferences, via the audio manager 232, whenever adjusted. The plurality of predetermined signal gain indexes may be stored in one or more look-up tables in the system memory 204, where they may be retrieved based on applicable audio modes.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for Audio System Volume Control.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for audio processing, using a processor or circuit within a communication device, comprising:

determining, for a combined output audio signal that includes a plurality of component audio signals, again component audio signals;

determining a total gain of the combined output audio signal as a sum of the determined gains of the plurality of component audio signals in response to detecting an off-hook state of the communication device;

comparing the total gain to a predefined saturation threshold;

implementing a volume control algorithm to limit the total gain when the total gain exceeds the predefined saturation threshold, the volume control algorithm comprising:

determining audio requirements for each of a plurality of audio processing devices in a downlink processing path of the communication device;

determining a default mix signal gain, a downlink gain adjustment, and a calibration gain based on the determined audio requirements; and calculating a mixed gain for the downlink processing path based on the determined default mix signal gain, the downlink gain adjustment and the calibration gain; and adjusting the total gain based on the mixed gain.

2. The method according to claim 1, wherein the downlink processing path handles communication of the plurality of component audio signals corresponding to a downlink voice call audio stream, ring tones, music, or dual-tone multi-frequency (DTMF) based audio playback.

3. The method according to claim 1, comprising acquiring the location of the communication device from a global navigation system satellite (GNSS) receiver communicatively coupled to the communication device.

4. The method according to claim 1, wherein values for the calibration gain are determined during calibration of the communication device.

5. The method according to claim 1, wherein the downlink gain adjustment is calculated based on an adjustment step-size or a mode based gain index.

6. The method according to claim 1, further comprising applying a default signal gain to each of the plurality of component audio signals in the downlink path of the communication device in response to detecting an on-hook state of the communication device.

7. The method according to claim 1, wherein the total gain is adjusted by adjusting corresponding gains of the plurality of component audio signals.

8. The method according to claim 5, comprising determining the adjustment step-size based on user input.

9. The method according to claim 5, comprising selecting the signal gain index from a plurality of predetermined signal gain indexes.

10. The method according to claim 9, wherein each of the plurality of predetermined signal gain indexes corresponds to an audio play combination, the audio play combination comprising audio signals from at least one source in the communication device.

11. The method according to claim 9, comprising storing the plurality of predetermined signal gain indexes in at least one look-up table in a memory of the communication device.

12. A system for audio processing, comprising:

one or more processors and/or circuits within a communication device configured to:

determine, for a combined output audio signal that includes a plurality of component audio signals, a gain for each of the plurality of component audio signals;

determine a total gain of the combined output audio signal as a sum of the determined gains of the plurality of component audio signals in response to detecting an off-hook state of the communication device;

compare the total gain to a predefined saturation threshold;

implement a volume control algorithm when the total gain exceeds the predefined saturation threshold, the volume control algorithm comprising:

determining audio requirements for each of a plurality of audio processing devices in a downlink processing path of the communication device;

determining a default mix signal gain, a downlink gain adjustment and a calibration gain based on the determined audio requirements; and calculating a mixed gain for the downlink processing path based on the determined default mix signal gain, the downlink gain adjustment and the calibration gain; and adjust the total gain based on the mixed gain.

13. The system according to claim 12, wherein the downlink processing path handles communication of the plurality of component audio signals corresponding to a downlink voice call audio stream, ring tones, music, or dual-tone multi-frequency (DTMF) based audio playback.

14. The system according to claim 12, wherein the one or more processors and/or circuits is configured to determine values for the calibration gain during calibration of the communication device.

15. The system according to claim 12, wherein the one or more processors and/or circuits is configured to calculate the downlink gain adjustment based on an adjustment step-size or a signal mode based gain index.

16. The system according to claim 15, wherein the one or more processors and/or circuits is configured to determine the adjustment step-size based on user input.

17. The system according to claim 15, wherein the one or more processors and/or circuits is configured to select the signal mode based gain index from a plurality of predetermined signal mode based gain indexes.

18. The system according to claim 17, wherein each of the plurality of predetermined signal mode based gain indexes corresponds to an audio play combination, the audio play combination comprising audio signals from at least one source in the communication device.

19. The system according to claim 17, wherein the plurality of predetermined signal mode based gain indexes are stored in at least one look-up table in a memory of the communication device.

20. A communication device, comprising one or more processors and/or circuits configured to:

generate a combined audio output signal having a plurality of component audio signals;

determine a gain for each of the plurality of component audio signals;

determine whether the communication device is in an on-hook or an off-hook state;

in response to determining that the communication device is in the off-hook state, calculate a total gain of the combined audio output signal as a sum of the determined gains of the plurality of component audio signals;

apply a first gain to the combined audio output signal in response to determining that the communication device is in the on-hook state; and apply a second gain to the combined audio output signal in response to determining that the communication device is in the off-hook state.

21. The communication device of claim 20, wherein the one or more processors and/or circuits are further configured to:

in response to determining that the communication device is in the off-hook state, compare the total gain to a predetermined saturation threshold;

calculate a controlled gain in response to the total gain exceeding the predetermined saturation threshold; and modify the total gain based on the controlled gain in response to the total gain exceeding the predetermined saturation threshold.

* * * * *